United States Patent
Liao et al.

(10) Patent No.: US 9,756,747 B1
(45) Date of Patent: Sep. 5, 2017

(54) PORTABLE ELECTRONIC DEVICE AND SUPPORTING MODULE THEREOF

(71) Applicant: WISTRON CORP., New Taipei (TW)

(72) Inventors: Ping-Feng Liao, New Taipei (TW);
Tsung-Hsien Chen, New Taipei (TW);
Po-Yuan Hsu, New Taipei (TW);
Chia-Cheng Su, New Taipei (TW);
Te-Wei Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 15/271,069

(22) Filed: Sep. 20, 2016

(30) Foreign Application Priority Data

Jul. 6, 2016 (TW) .............................. 105121459 A (51) Int. Cl.
*H05K 5/02* (2006.01)
*G06F 1/16* (2006.01)

(52) U.S. Cl.
CPC ......... *H05K 5/0234* (2013.01); *G06F 1/1626* (2013.01)

(58) Field of Classification Search
CPC combination set(s) only.
See application file for complete search history.

(56) References Cited

U.S. PATENT DOCUMENTS

2012/0328222 A1   12/2012   Chen et al.

FOREIGN PATENT DOCUMENTS

| CN | 203384601 U | 1/2014 |
|----|-------------|--------|
| TW | 201109560 A | 3/2011 |
| TW | M470486 U   | 1/2014 |
| TW | M486238 U   | 9/2014 |

OTHER PUBLICATIONS

TW Office Action dated Oct. 21, 2016 as received in Application No. 105121459 (English Translation).

*Primary Examiner* — Lisa Lea Edmonds
(74) *Attorney, Agent, or Firm* — Maschoff Brennan (57) ABSTRACT

A supporting module includes a frame, a support and a rod. The frame includes a main portion, a first fastening portion and an elastic arm. The main portion has a groove. The first fastening portion and the elastic arm are disposed close to an end of the groove, and the first fastening portion and the elastic arm are disposed in the groove, wherein the first side and the second side are opposite to each other. The support has a first connection portion pivoted on the frame, and a second connection portion. The rod includes a bar portion, a pivotal portion and a movable portion. The pivotal portion and the movable portion are disposed on the bar portion. The pivotal portion is pivoted on the second connection portion. The movable portion is slidable in the groove, and the movable portion includes a second fastening portion.

12 Claims, 12 Drawing Sheets

PORTABLE ELECTRONIC DEVICE AND SUPPORTING MODULE THEREOF

CROSS-REFERENCE TO RELATED APPLICATIONS

This non-provisional application claims priority under 35 U.S.C. §119(a) on Patent Application No(s). 105121459 filed in Taiwan R.O.C. on Jul. 6, 2016, the entire contents of which are hereby incorporated by reference.

TECHNICAL FIELD

The present disclosure provides a supporting module and a portable electronic device, more particular to a supporting module for standing an electronic device on a surface, and a portable electronic device having the supporting module.

BACKGROUND

With the development of the technology, the popularity of personal computers (PCs) is increasing. A desktop should be positioned at specific locations due to the limitation of the volume, the weight, and the length of the cable. Due to the improvement of technology and the integration of members in the electronic product, compact, thin and light weight personal computers, such as laptop computers, tablet computers and all-in-one (AIO) PCs, have become more popular in recent years.

Take the tablet computer as an example, the tablet computer is usually equipped with a cover which can be adapted for supporting the tablet computer, such that people can manually handle the tablet computer or stand the tablet computer on the table by the cover. However, people need to perform overly complex operation on the cover to support the tablet computer. The cover is also incapable of providing sufficient stability, and thereby the tablet computer easily falls down.

SUMMARY

The disclosure provides a supporting module and a portable electronic device including the supporting module, wherein the supporting module is favorable for simplifying the operation while providing sufficient stability.

According to one aspect of the disclosure, a supporting module includes a frame assemblable with a body of electronic device, a support and a rod. The frame includes a main portion, at least one first fastening portion and an elastic arm. The main portion has a groove, and the groove has a first end and a second end which are opposite to each other. The first fastening portion and the elastic arm are disposed close to the second end of the groove, and the first fastening portion and the elastic arm are respectively disposed on a first side and a second side of the groove, wherein the first side and the second side are opposite to each other. The support has a first connection portion and a second connection portion, and the first connection portion is pivoted on the frame. The rod includes a bar portion, a pivotal portion and a movable portion. The pivotal portion and the movable portion are respectively disposed on two ends of the bar portion, wherein the two ends of the bar portion are opposite to each other. The pivotal portion is pivoted on the second connection portion of the support. The movable portion is slidable in the groove, and the movable portion includes at least one second fastening portion. When the movable portion is slid to the second end of the groove, the rod is pressed by the elastic arm, such that the second fastening portion is fastened with the first fastening portion for fixing the movable portion. When the support is moved close to the frame by a force, the elastic arm is pressed by the rod, such that the second fastening portion is detached from the first fastening portion for releasing the movable portion.

According to another aspect of the disclosure, a portable electronic device includes a body and the aforementioned supporting module. The frame of the supporting module is assembled with the body.

According to still another aspect of the disclosure, a portable electronic device includes an electronic member and the aforementioned supporting module. The electronic member is disposed in the frame of the supporting module.

According to the disclosure, the second fastening portion can be fastened with the first fastening portion to fix the position of the support, and the second fastening portion is detachable from the first fastening portion to release the support when the elastic arm is pressed. Therefore, the user is able to open, position and close the support by one hand, and thereby the operation for standing the electronic device is simplified. Also, the electronic device is capable of standing on the supporting surface more stably by the interaction among the first fastening portion, the second fastening portion and the elastic arm.

BRIEF DESCRIPTION OF THE DRAWINGS

The present disclosure will become more understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
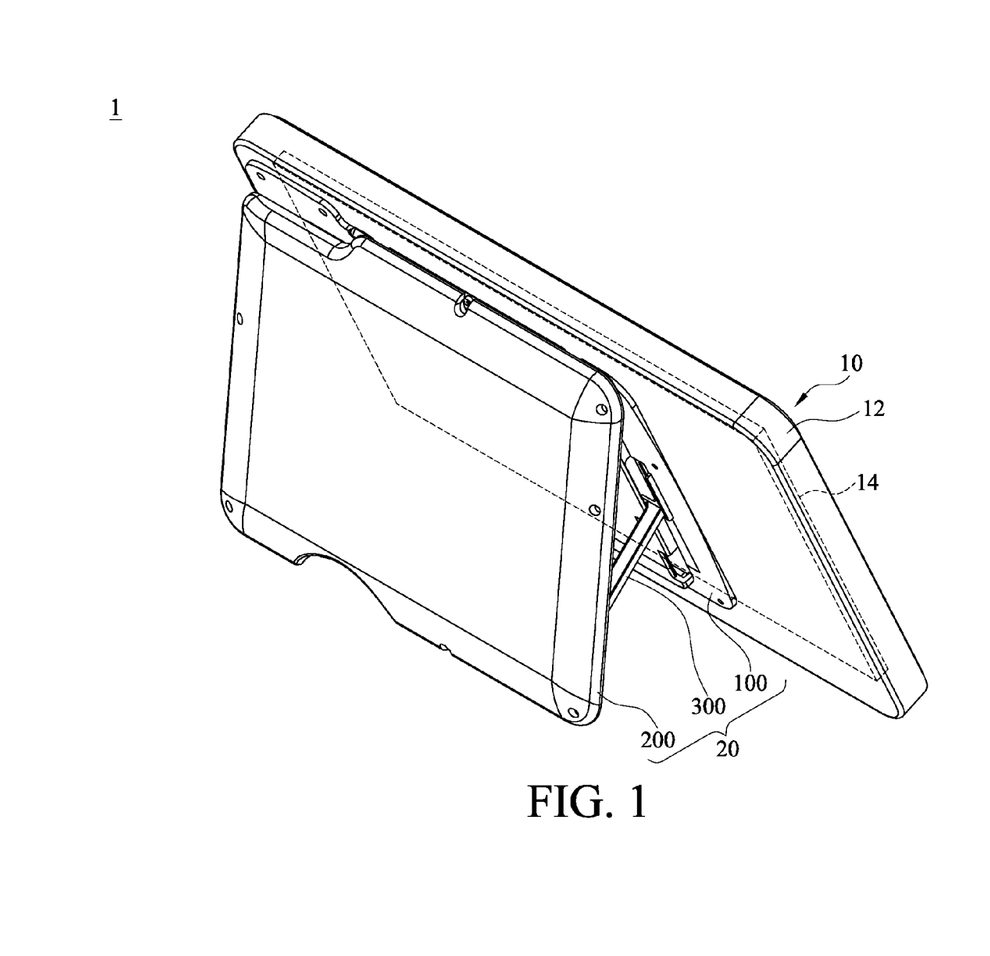
FIG. 1 is a perspective view of a portable electronic device according to an embodiment.
Figure 2:
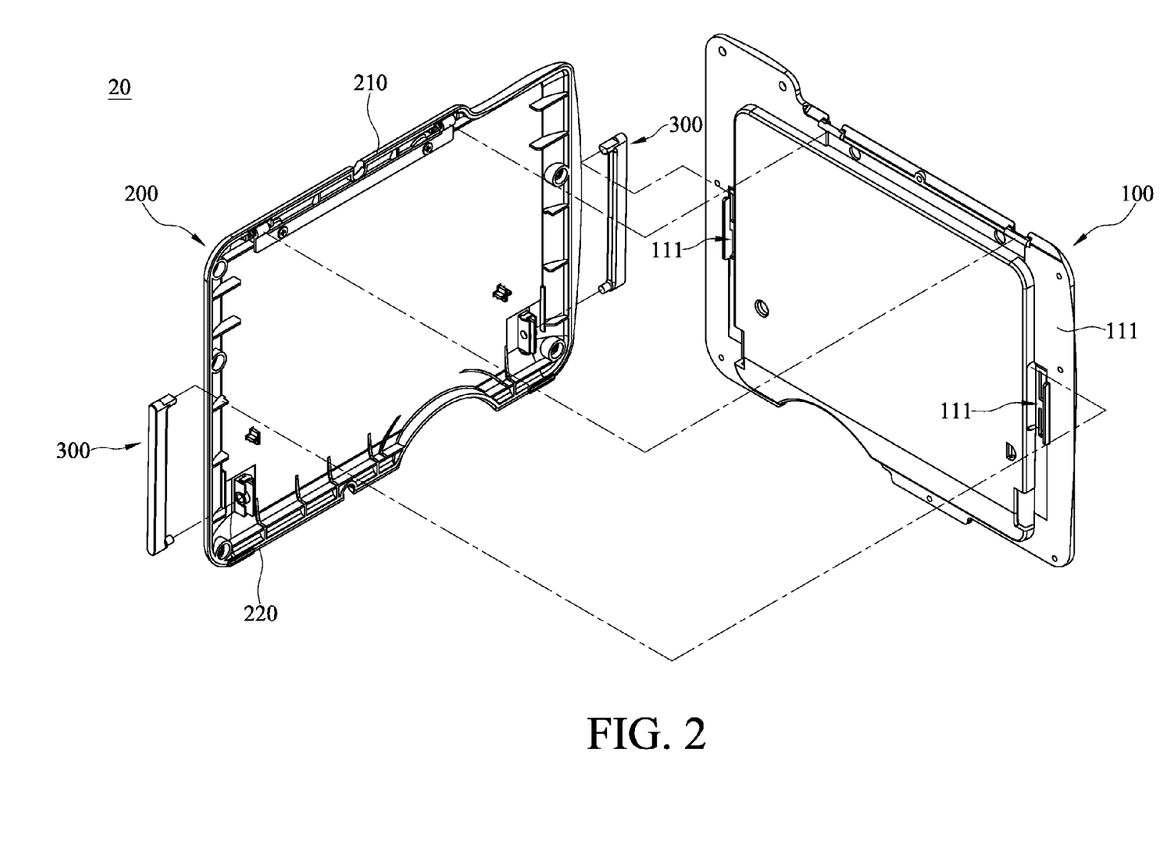
FIG. 2 is an exploded view of the portable electronic device in FIG. 1.

Please refer to FIG. 1 and FIG. 2. FIG. 1 is a perspective view of a portable electronic device according to an embodiment. FIG. 2 is an exploded view of the portable electronic device in FIG. 1.

In this embodiment, a portable electronic device 1 includes a body 10 and a supporting module 20. The body 10 is, for example, a cell phone, a touch panel or an AIO computer. The body 10 includes a case 12 and an electronic member 14. The electronic member 14 is disposed in the case 12. In some other embodiments, the case can be a cover of the electronic member. The supporting module 20 is detachably assembled with the body 10 for supporting the body 10.

Figure 3:
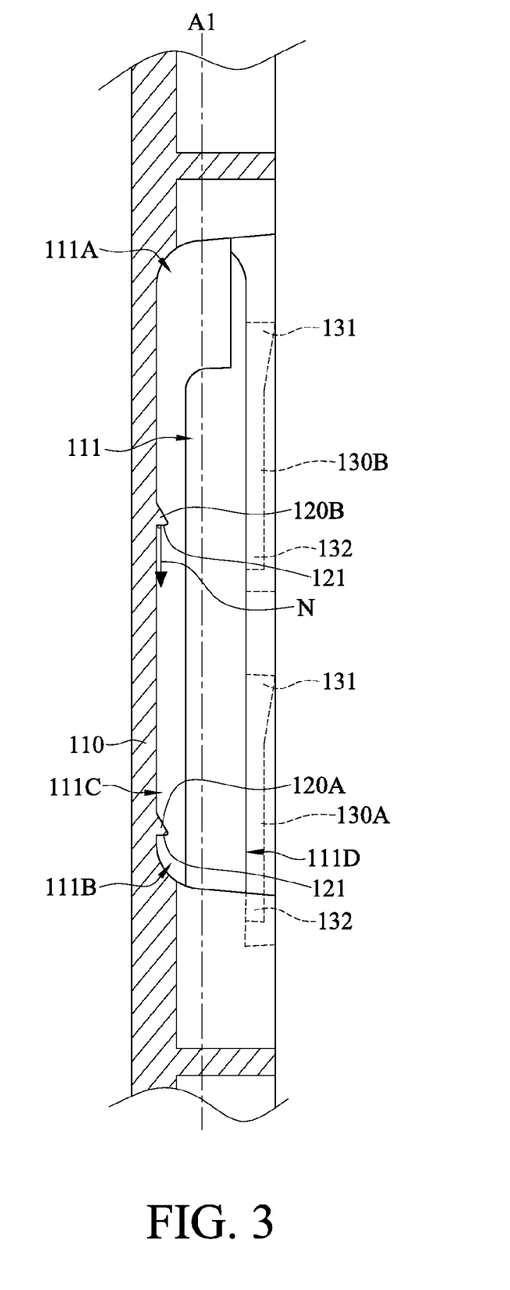
FIG. 3 is a cross sectional view of a frame of the portable electronic device in FIG. 2.

The supporting module 20 includes a frame 100, a support 200 and two rods 300. Please refer to FIG. 2 and FIG. 3. FIG. 3 is a cross sectional view of a frame of the portable electronic device in FIG. 2. The frame 100 includes a main portion 110, two first fastening sets and two elastic sets. The main portion 110 of the frame 100 is assembled with the case 12 of the body 10. There are two grooves 111 respectively disposed on two opposite sides of the main portion 110. The two grooves 111 extend along an extension axis A1, and each of the two grooves 111 has a first end 111A and a second end 111B opposite to each other. The two first fastening sets respectively correspond to the first sides 111C of the two grooves 111. In detail, each of the first fastening sets includes two first fastening portions 120A, 120B, and a distance between the first fastening portion 120A and the first end 111A of the groove 111 is different from a distance between the first fastening portion 120B and the first end 111A. For example, the first fastening portion 120A is disposed on the second end 111B of the groove 111, and the first fastening portion 120B is disposed between the first end 111A and the second end 111B.

The two elastic sets respectively correspond to the second sides 111D of the two grooves 111. In detail, each of the elastic sets includes two elastic arms 130A, 130B. Each of the two elastic arms 130A, 130B has a fix end 131 and a movable end 132 opposite to each other. The fix ends 131 of the elastic arms 130A, 130B, connected with the main portion 110, are disposed close to the second side 111D of the groove 111. The movable ends 132 of the elastic arms 130A, 130B are disposed on the second side 111D of the groove 111 and are bendable.

In detail, the movable ends 132 respectively correspond to the two first fastening portions 120A, 120B. As shown in FIG. 3, for the configuration in one of the groove 111, the movable end 132 of the elastic arm 130A and the first fastening portion 120A are disposed close to the second end 111B of the groove 111, and the movable end 132 of the elastic arm 130A and the first fastening portion 120A are respectively disposed on the second side 111D and the first side 111C. The movable end 132 of the elastic arm 130B and the first fastening portion 120B are disposed close to the middle section of the groove 111, and the movable end 132 of the elastic arm 130B and the first fastening portion 120B are respectively disposed on the second side 111D and the first side 111C.

Figure 4A:
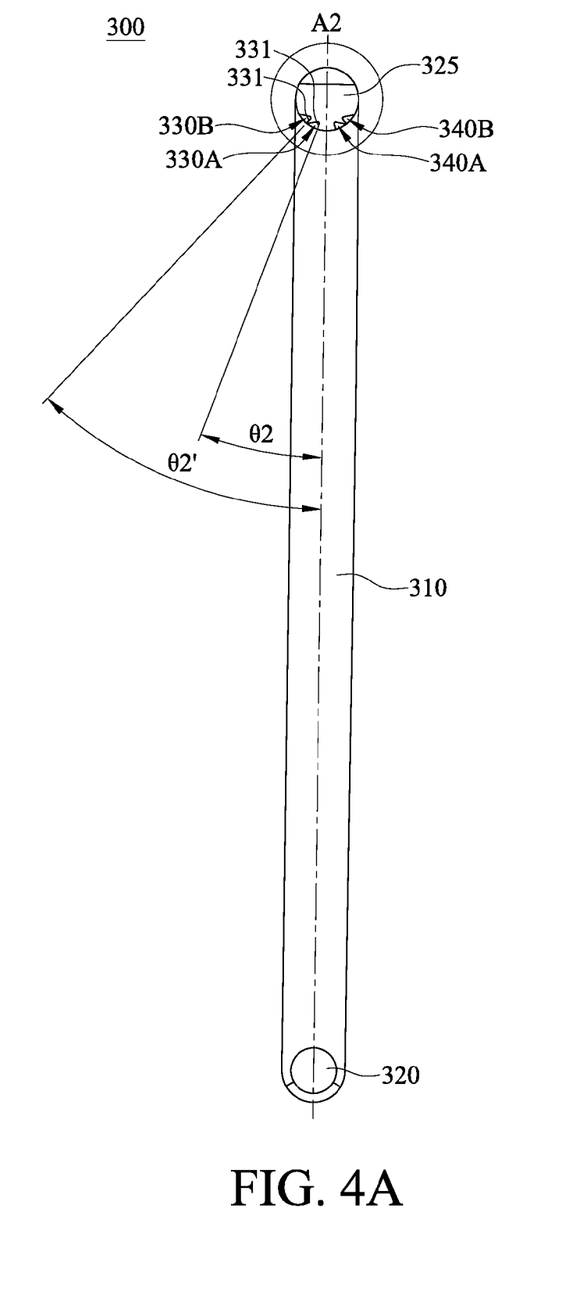
FIG. 4A is a side view of a rod of the portable electronic device in FIG. 2.
Figure 4B:
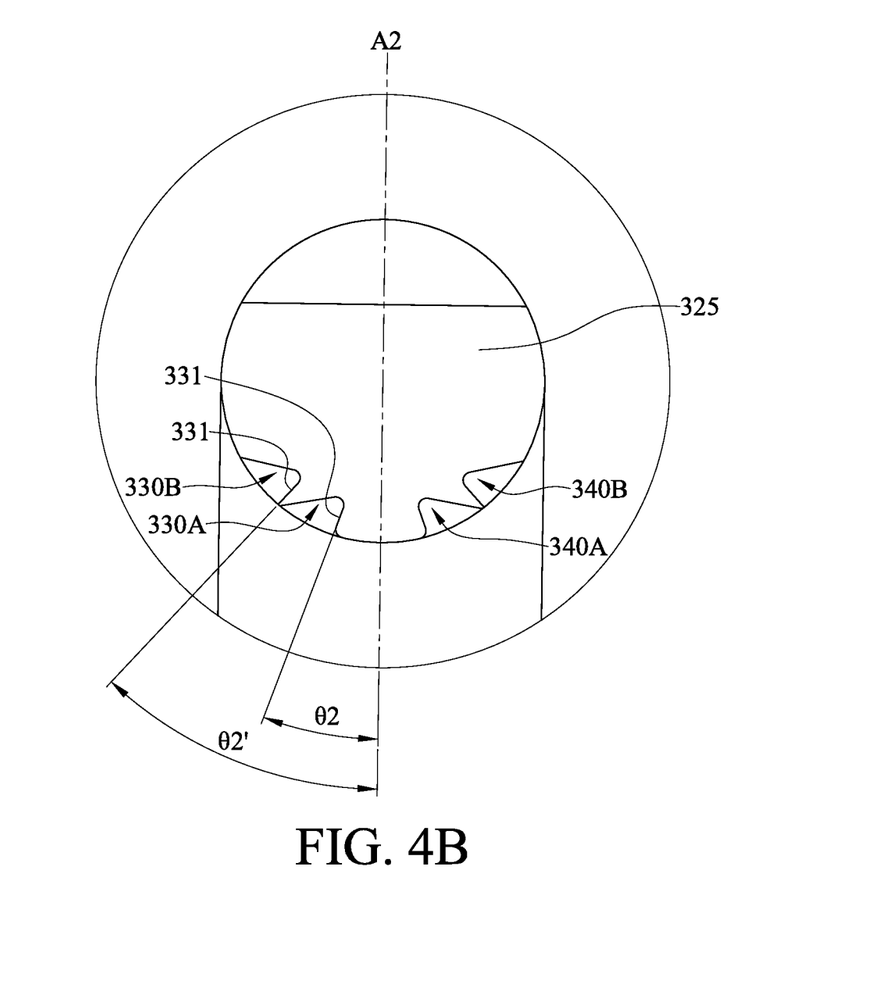
FIG. 4B is an enlarged view of the rod in FIG. 4A.

The support 200 has a first connection portion 210 and a second connection portion 220, and the first connection portion 210 is pivoted on the frame 100. Please refer to FIG. 2, FIG. 4A and FIG. 4B. FIG. 4A is a side view of a rod of the portable electronic device in FIG. 2. FIG. 4B is an enlarged view of the rod in FIG. 4A.

In this embodiment, the first fastening portion 120A is closer to the second connection portion 220 than the movable end 132 of the elastic arm 130A, and the first fastening portion 120B is closer to the second connection portion 220 than the movable end 132 of the elastic arm 130B, but the disclosure is not limited thereto. In some other embodiments, the first fastening portion is farther away from the second connection portion than the movable end of the elastic arm.

The two rods 300 are disposed between the frame 100 and the support 200, and the two rods 300 are connected with the frame 100 and the support 200. The two rods 300 are respectively disposed on two opposite sides of the frame 100. In detail, each of the rods 300 includes a bar portion 310, a pivotal portion 320 and a movable portion 325. The pivotal portion 320 and the movable portion 325 are respectively disposed on two opposite ends of the bar portion 310. The pivotal portion 320 is pivoted on the second connection portion 220 of the support 200, and the movable portion 325 is slidably disposed in the groove 111. The movable portion 325 includes two second fastening portions 330A, 330B disposed apart from each other. In this embodiment, the second fastening portions 330A, 330B are two slots, and the first fastening portions 120A, 120B are two blocks which can be fastened with the two slots. When the movable portion 325 is slid to the second end 111B of the groove 111, the rod 300 is pressed by the elastic arm 130A, such that the second fastening portion 330A of the movable portion 325 is fastened with the first fastening portion 120A to fix the movable portion 325. When the second connection portion 220 of the support 200 is moved close to the frame 100 by a force, the elastic arm 130A is pressed by the rod 300, such that the second fastening portion 330A is detached from the first fastening portion 120A to release the movable portion 325. Thus, the inclination of the support 200 relative to the frame 100 is adjustable.

In this embodiment, the fix ends 131 of the elastic arms 130A, 130B are closer to the first end 111A of the groove 111 than the movable ends 132 of the elastic arms 130A, 130B. Thus, it is favorable for the movable portion 325 to be guided by the elastic arm 130A or 130B to slide from the second end 111B back to the first end 111A of the groove 111.

In this embodiment, the second fastening portions 330A, 330B are two slots, and the first fastening portions 120A, 120B are two blocks, but the disclosure is not limited thereto. Further, each of the first fastening portions 120A, 120B has a stopping surface 121, and a normal line N of the stopping surface 121 is parallel to the extension axis A1 of the groove 111.

Figure 6:
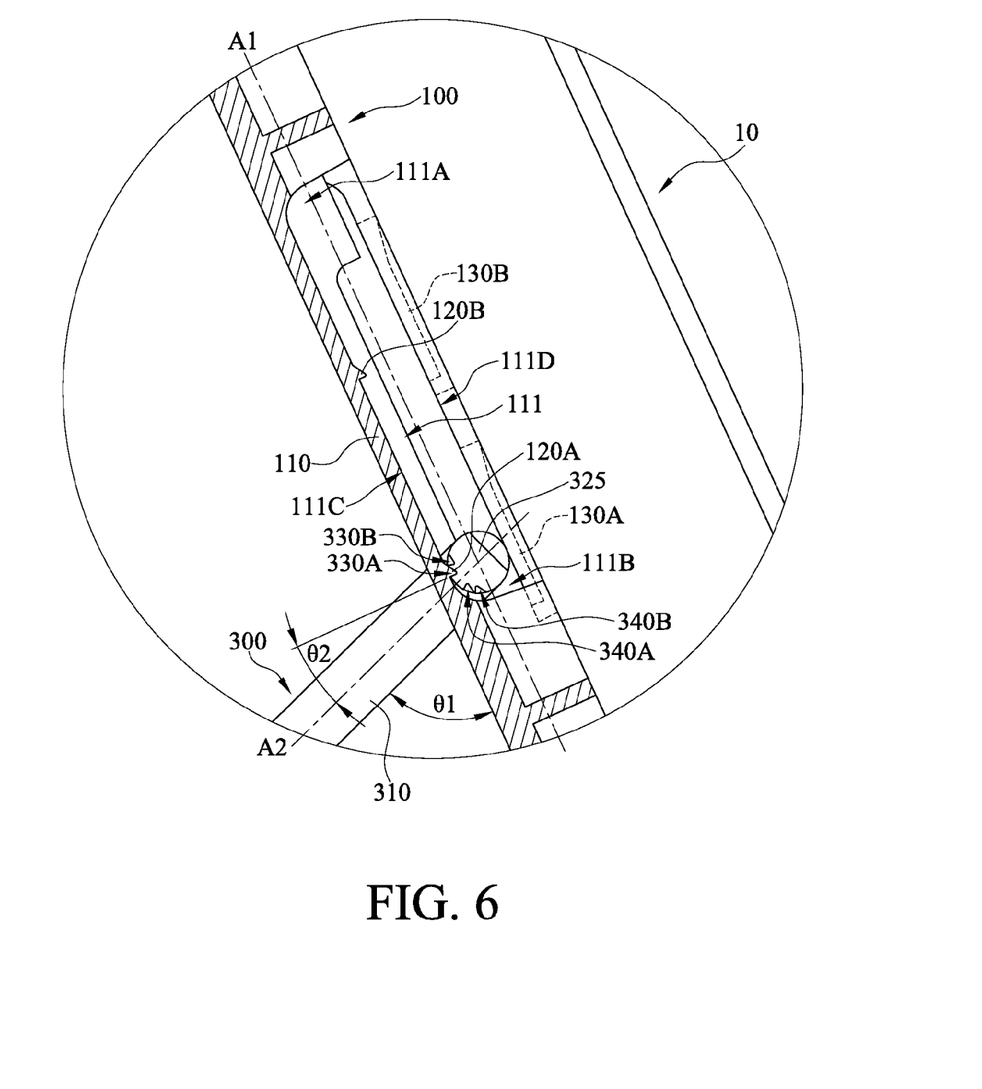

Moreover, in this embodiment, each of the second fastening portions 330A, 330B has a pressing surface 331. An angle θ2 between one of the pressing surfaces 331 and an extension axis A2 of the bar portion 310 is different from an angle θ2' between the other of the pressing surfaces 331 and the extension axis A2. The two pressing surfaces 331 respectively correspond to the two stopping surfaces 121. Please refer to FIG. 6 in advance, when the second fastening portion 330A is fastened with the first fastening portion 120A, there is an angle θ1 between the extension axis A1 of the groove 111 and the extension axis A2 of the bar portion 310, and there is the angle θ2 between the pressing surface 331 and the extension axis A2. A sum of the angles θ1 and θ2 (θ1+θ2) can be equal to 90 degrees. In this embodiment, take the quantity of the second fastening portions 330A, 330B to be two for further explanation. As shown in FIG. 6, when the second fastening portion 330A is fastened with the first fastening portion 120A, the angle θ1 can be 70 degrees, and the angle θ2 can be 20 degrees. Please refer to FIG. 8 in advance, when the second fastening portion 330B is fastened with the first fastening portion 120B, the angle θ1' can be 47.5 degrees, and the angle θ2' can be 42.5 degrees.

As shown in FIG. 6, each of the rods 300 can includes two third fastening portions 340A, 340B. The third fastening portions 340A, 340B and the second fastening portions 330A 330B are all located on the same end of the rod 300. The second fastening portions 330A 330B and the third fastening portions 340A, 340B are symmetrical about the extension axis A2 of the bar portion 310. An advantage of the rod 300 including the second fastening portions 330A, 330B and the third fastening portions 340A, 340B is that the rod can have better commonality; that is, the rod 300 is applicable no matter which side of the frame 220 does the rod 300 is disposed, and it is also favorable for assembling the rod 300 without considering assembling direction so as to improve the assembling efficiency.

Please refer to FIG. 5 through FIG. 10, which are schematic views of using the portable electronic device in FIG. 1. In this embodiment, a user is able to fully open the support 200 by one hand.

Figure 5:
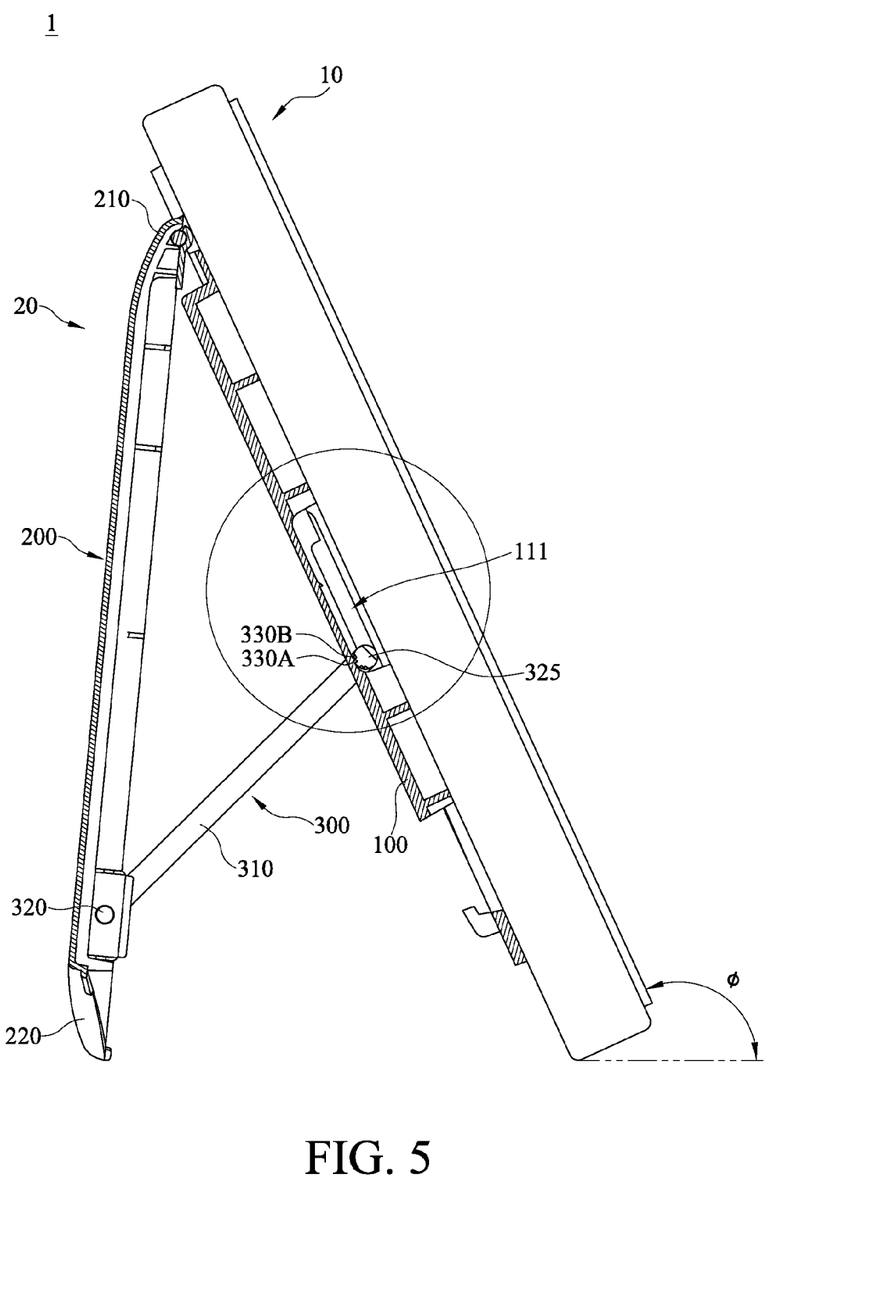
FIG. 5 through FIG. 10 are schematic views of using the portable electronic device in FIG. 1.

As shown in FIG. 4B, FIG. 5 and FIG. 6, when the support 200 is fully opened, the rod 300 is pressed by the elastic arm 130A such that the second fastening portion 330A is fastened with the first fastening portion 120A. At this state, the movable portion 325 is fixed to the second end 111B of the groove 111, and there is an inclination Φ between the body 100 and a supporting surface (its reference number is omitted). The inclination Φ is, for example, 115 degrees. Furthermore, since the angle θ1 (70 degrees) and the angle θ2 (20 degrees) are complementary angles, it is favorable for the stopping surface 121 of the first fastening portion 120A to be firmly abutted against the pressing surface 331 of the second fastening portion 330A, thereby stopping the movement of the support 200 to improve stability.

Figure 7:
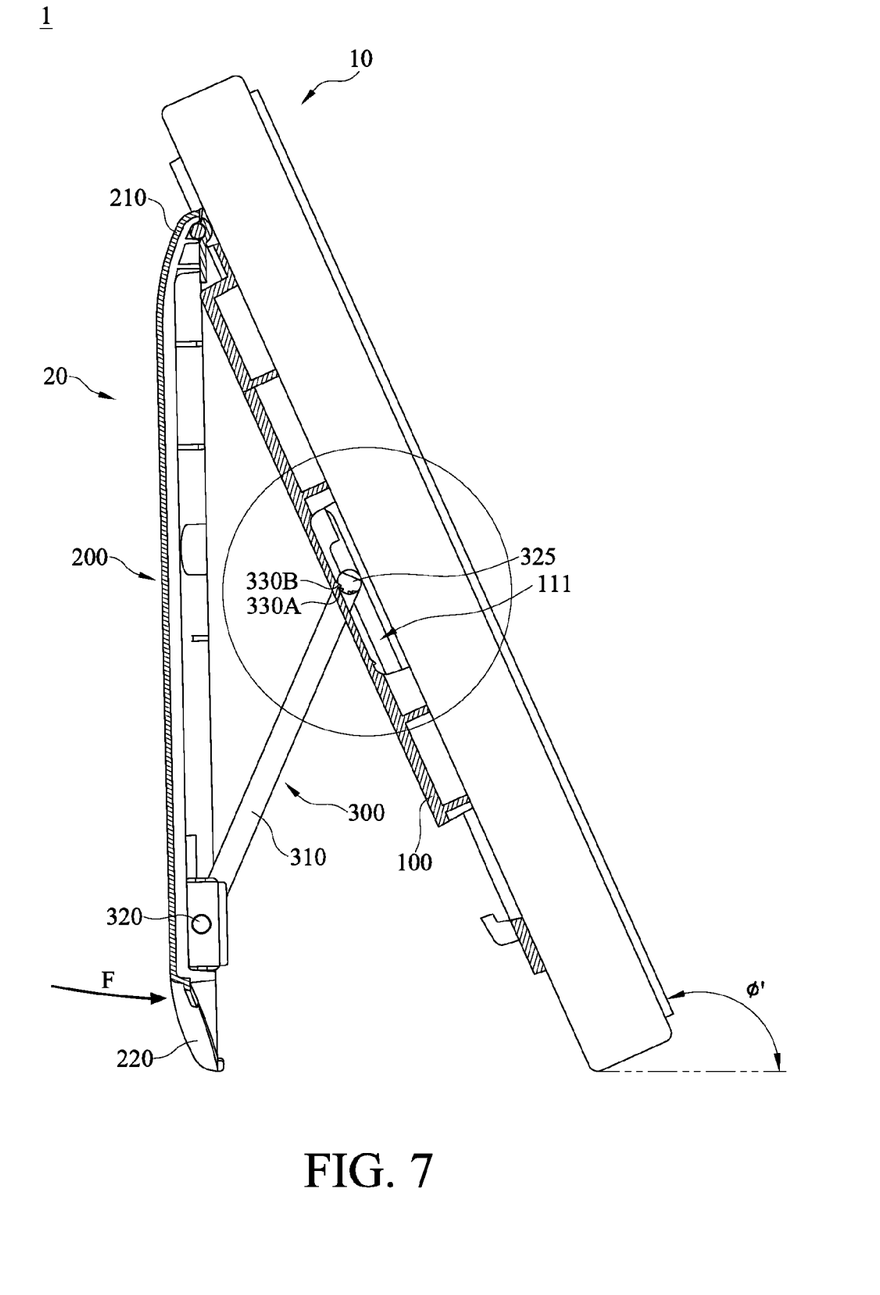
Figure 8:
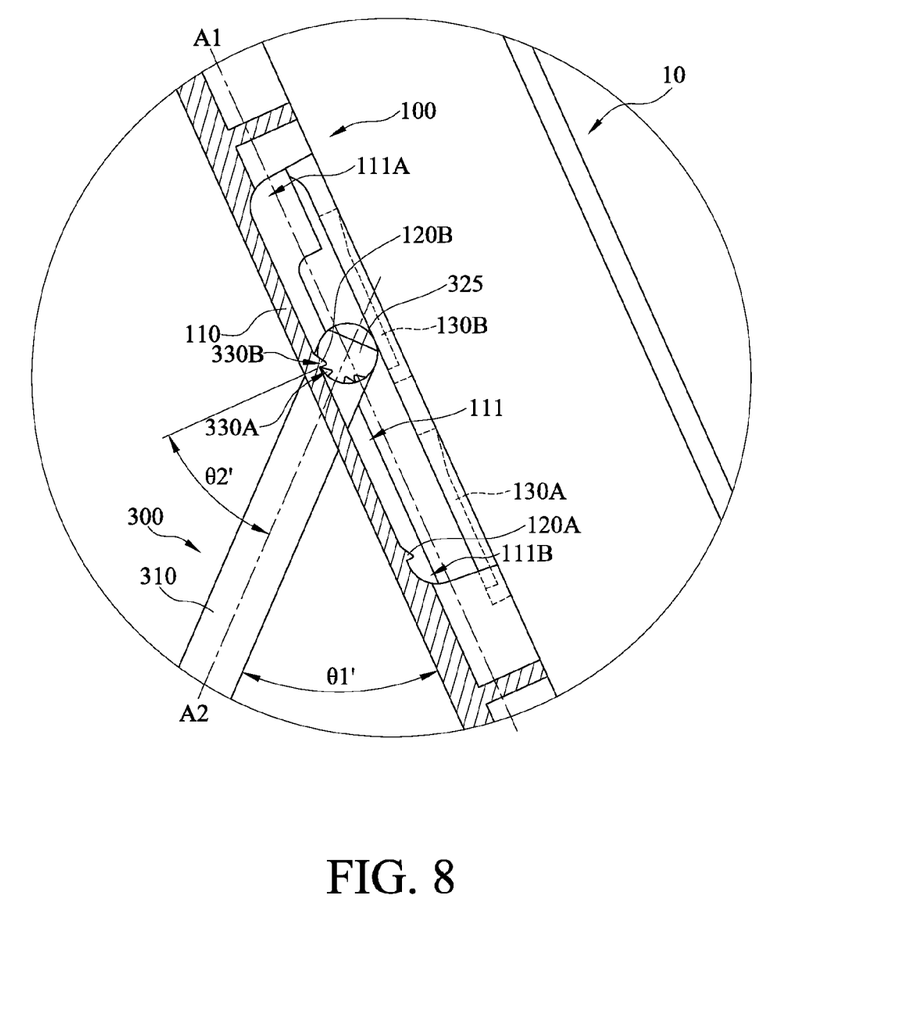
Figure 9:
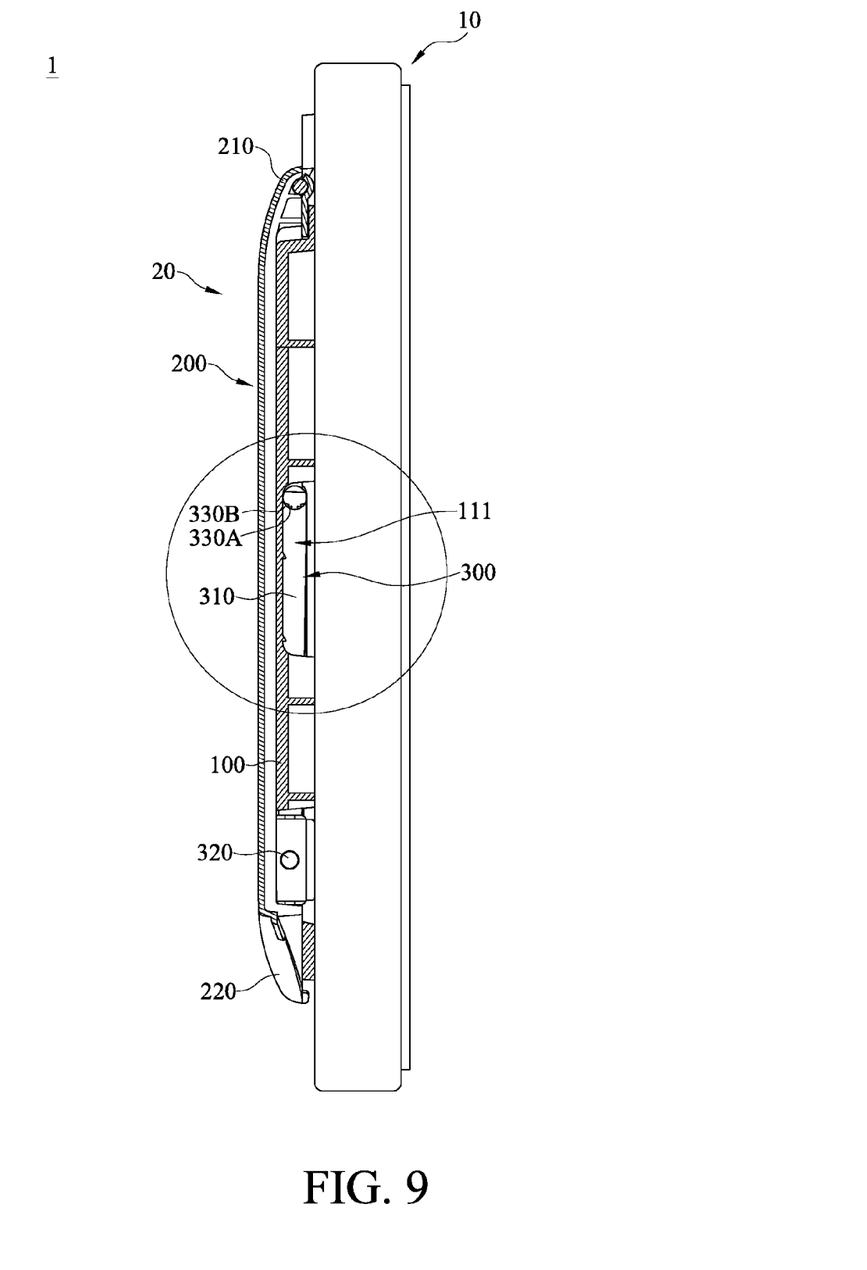
Figure 10:
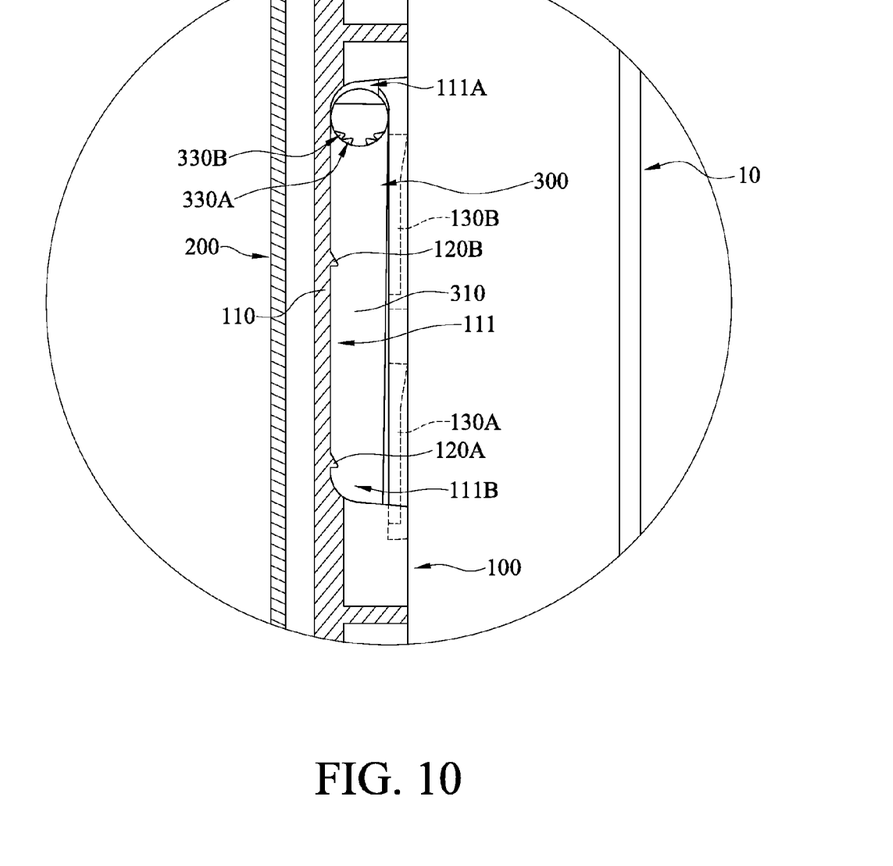

As shown in FIG. 4B, FIG. 7 and FIG. 8, the user is able to apply a force F to press a side of the second connection portion 220 away from the frame 100. In this embodiment, the force F can be greater than 7.7 gw and less than 1 kgw. When the second connection portion 220 is pressed by the force F, the second connection portion 220 is moved to drive the rod 300 to press the elastic arm 130A, such that an empty space in the groove 111 is generated. Therefore, the second fastening portion 330A is detached from the first fastening portion 120A, and the movable portion 325 of the rod 300 can be slid in the empty space to move toward the first end 111A of the groove 111. Thus, the second connection portion 220 of the support 200 is moved close to the frame 100, and the second fastening portion 330B is fastened with the first fastening portion 120B. At this state, an inclination Φ' is between the body 100 and the supporting surface. The inclination Φ' is, for example, 114.5 degrees. Furthermore, since the angle θ1' (47.5 degrees) and the angle θ2' (42.5 degrees) are complementary angles, it is favorable for the stopping surface 121 of the first fastening portion 120B to be firmly abutted against the pressing surface 331 of the second fastening portion 330B, thereby stopping the movement of the support 200 to improve stability.

As shown in FIG. 4B, FIG. 7, FIG. 9 and FIG. 10, the user is able to apply a force (shown by the arrow F) again by one hand to press the side of the second connection portion 220 away from the frame 100. When the second connection portion 220 is pressed, the second connection portion 220 is moved to drive the rod 300 to press the elastic arm 130B, such that the empty space in the groove 111 is generated. Therefore, the second fastening portion 330B is detached from the first fastening portion 120B, and the movable portion 325 of the rod 300 can be slid in the empty space to further move toward the first end 111A. Thus, the second connection portion 220 is further moved close to the frame 100, such that the support 200 is fully closed.

In this embodiment, for the configuration of one rod 300 with one groove 111, the first fastening portion, the elastic arm and the second fastening portion are all two in quantity, but the disclosure is not limited thereto. In some other embodiments, the first fastening portion, the elastic arm and the second fastening portion can be one in quantity for the configuration of one rod with one groove.

The frame 100 and the case 12 of the body 10 are two independent pieces in the aforementioned embodiment, but the disclosure is not limited thereto. Please refer to FIG. 11, which is a perspective view of a portable electronic device according to another embodiment. Since this embodiment is similar to the aforementioned embodiment, only the differences will be illustrated hereafter.

Figure 11:
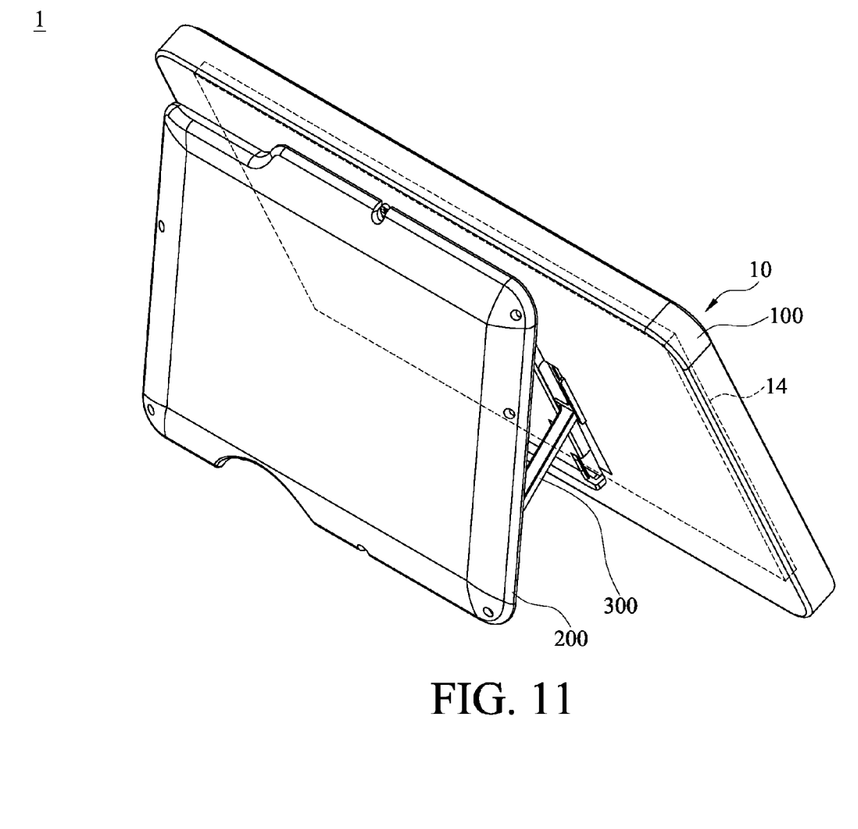
FIG. 11 is a perspective view of a portable electronic device according to another embodiment.

The frame 100 of the portable electronic device 1 in this embodiment is integral with the case 12 of the body 10 in the aforementioned embodiment, and the electronic member 14 is disposed in the frame 100. Thus, the frame 100 is favorable for being assembled with the support 200, and protecting the electronic member 14.

According to the disclosure, the second fastening portion can be fastened with the first fastening portion to fix the position of the support, and the second fastening portion is detachable from the first fastening portion to release the support when the elastic arm is pressed. Therefore, the user is able to open, position and close the support by one hand, and thereby the operation for standing the electronic device is simplified. Also, the electronic device is capable of standing on the supporting surface more stably by the interaction among the first fastening portion, the second fastening portion and the elastic arm.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A supporting module, comprising:
a frame assemblable with a body of electronic device, the frame comprising a main portion, at least one first fastening portion and an elastic arm, the main portion having a groove, the groove having a first end and a second end which are opposite to each other, the at least one first fastening portion and the elastic arm disposed close to the second end of the groove, and the at least one first fastening portion and the elastic arm respectively disposed on a first side and a second side of the groove, the first side and the second side being opposite to each other;
a support comprising a first connection portion and a second connection portion, and the first connection portion pivoted on the frame; and
a rod comprising a bar portion, a pivotal portion and a movable portion, the pivotal portion and the movable portion respectively disposed on two ends of the bar portion, the two ends of the bar portion being opposite to each other, the pivotal portion pivoted on the second connection portion of the support, the movable portion being slidable in the groove, and the movable portion comprising at least one second fastening portion;
wherein, when the movable portion is slid to the second end of the groove, the rod is pressed by the elastic arm such that the at least one second fastening portion is fastened with the at least one first fastening portion for fixing the movable portion; when the support is moved close to the frame by a force, the elastic arm is pressed by the rod such that the at least one second fastening portion is detached from the at least one first fastening portion for releasing the movable portion.

2. The supporting module according to claim 1, wherein the elastic arm has a fix end and a movable end which are opposite to each other, the fix end is connected to the main portion of the frame, the movable end and the at least one first fastening portion of the frame are respectively disposed on the second side and the first side of the groove, and the movable end and the at least one first fastening portion are corresponded to each other.

3. The supporting module according to claim 2, wherein the movable end of the elastic arm is farther away from the second connection portion of the support than the at least one first fastening portion of the frame.

4. The supporting module according to claim 2, wherein the movable end of the elastic arm is closer to the second connection portion of the support than the at least one first fastening portion of the frame.

5. The supporting module according to claim 2, wherein the fix end of the elastic arm is closer to the first end of the groove than the movable end.

6. The supporting module according to claim 1, wherein the at least one first fastening portion is a block, and at least one second fastening portion is a slot corresponding to the block.

7. The supporting module according to claim 6, wherein the at least one first fastening portion has a stopping surface, and a normal line of the stopping surface is parallel to an extension axis of the groove.

8. The supporting module according to claim 7, wherein the at least one second fastening portion has a pressing surface corresponding to the stopping surface; when the at least one first fastening portion is fastened with the at least one second fastening portion, there is a first angle between an extension axis of the bar portion and the extension axis of the groove, there is a second angle between the pressing surface and the extension axis of the bar portion, and a sum of the first angle and the second angle is 90 degrees.

9. The supporting module according to claim 7, wherein a quantity of the at least one first fastening portion is two, and a distance between one of the two first fastening portions and the first end of the groove is different from a distance between the other one of the two first fastening portions and the first end of the groove; a quantity of the at least one second fastening portion is two, each of the two second fastening portions has a pressing surface, the two pressing surfaces respectively correspond to the two stopping surfaces, and an angle between one of the two pressing surfaces and an extension axis of the bar portion is different from an angle between the other one of the two pressing surfaces and the extension axis of the bar portion.

10. The supporting module according to claim 1, wherein the rod further comprises at least one third fastening portion, the at least one second fastening portion and the at least one third fastening portion are located on an end of the rod, and the at least one second fastening portion and the at least one third fastening portion are symmetrical about an extension axis of the bar portion.

11. A portable electronic device, comprising:
a body; and
the supporting module according to claim 1, wherein the frame of the supporting module is assembled with the body.

12. A portable electronic device, comprising:
an electronic member; and
the supporting module according to claim 1, wherein the electronic member is disposed in the frame of the supporting module.

* * * * *